(12) United States Patent
Overbye

(10) Patent No.: US 6,524,055 B1
(45) Date of Patent: Feb. 25, 2003

(54) SEMI-TRAILER LOADING RAMP FOR TRANSPORTING ATVS

(75) Inventor: Harold L. Overbye, Lakeville, MN (US)

(73) Assignee: Overbye Transport, Inc., Lakeville, MN (US)

( * ) Notice: Subject to any disclaimer, the term of this patent is extended or adjusted under 35 U.S.C. 154(b) by 0 days.

(21) Appl. No.: 09/950,531

(22) Filed: Sep. 13, 2001

(51) Int. Cl.[7] .................................................. B60P 3/06
(52) U.S. Cl. ............................ 414/537; 410/4; 410/26
(58) Field of Search ............................... 414/537; 410/3, 410/4, 24, 26

(56) References Cited

U.S. PATENT DOCUMENTS

| | | | |
|---|---|---|---|
| 2,432,228 A | | 12/1947 | De Lano |
| 3,027,580 A | * | 4/1962 | Haack ........................ 14/69.5 |
| 4,014,444 A | * | 3/1977 | Jakel ......................... 414/537 |
| 4,032,167 A | * | 6/1977 | Chereda ....................... 410/3 |
| 4,343,401 A | * | 8/1982 | Paulyson .................... 206/577 |
| 4,786,222 A | | 11/1988 | Blodgett |
| 4,874,284 A | | 10/1989 | New, Jr. |
| 4,966,510 A | * | 10/1990 | Johnson, Jr. ................. 410/26 |
| 5,106,246 A | * | 4/1992 | Chance ........................ 410/26 |
| 5,553,762 A | | 9/1996 | Brown |
| 5,669,745 A | * | 9/1997 | Anderson ..................... 410/87 |
| 5,907,276 A | | 5/1999 | Lance |
| 6,059,344 A | | 5/2000 | Radosevich |
| 6,217,053 B1 | | 4/2001 | Forsythe et al. |
| 6,368,034 B1 | * | 4/2002 | Frye ........................... 410/26 |

* cited by examiner

Primary Examiner—James W. Keenan
(74) Attorney, Agent, or Firm—Thomas J. Nikolai; Nikolai & Mersereau, P.A.

(57) ABSTRACT

In adapting a semi-trailer for hauling ATVs, modular track segments of a predetermined length for conveniently spanning a plurality of longitudinally spaced, transversely extending E-bars that attach to the logistic posts in the side wall of the semi-trailer are arranged to provide an elevated deck structure in the trailer on which additional ATVs can be placed. In order to load both the floor level and the elevated deck level, appropriately sized and configured ramps that extend from ground level to the trailer floor, or alternatively to the elevated deck structure, permit the ATVs to be driven onto the trailer floor or its elevated deck.

10 Claims, 6 Drawing Sheets

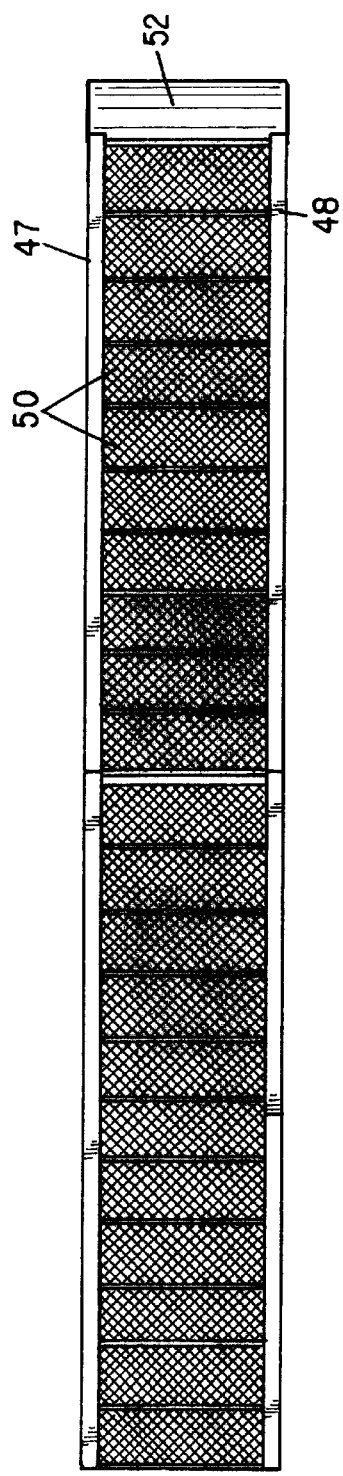
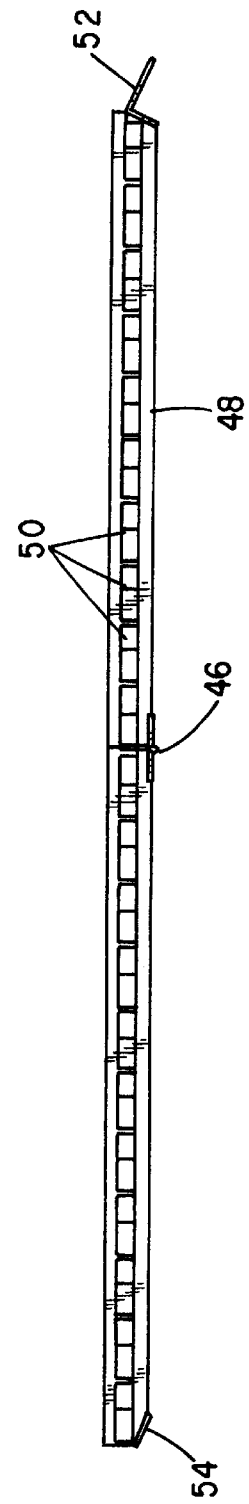
FIG. 5
FIG. 6

SEMI-TRAILER LOADING RAMP FOR TRANSPORTING ATVS

BACKGROUND OF THE INVENTION

I. Field of the Invention

This invention relates generally to a ramp system and decking for facilitating the loading and transport of all terrain vehicles (ATVs), and more particularly to a ramp and decking system that may be deployed in conventional semi-trailers used for hauling and shipping freight of all types.

II. Discussion of the Prior Art

Manufacturers of ATVs need a way to economically ship finished units from their factories to distributors and dealers throughout the country. While there is some variation in size between different manufacturers and in different models by the same manufacturer, a conventional ATV generally comprises a frame mounted by a suspension system to front and rear axles each having a pair of wheels with large diameter, low inflation pressure tires mounted thereon and driven by an engine through a transmission, both of which are mounted to the frame. The frame further supports a seat on which one or possibly two persons may ride.

The center-to-center distance between tires on the front and rear of the vehicle are typically about 41–60 inches depending on models. The overall length of the vehicle is about 52–120 inches and the height is about 42–52 inches depending on models.

A typical trailer for an 18-wheel semi-tractor trailer is 8 ft. 6 in. wide, 53 ft. long and from floor to ceiling is about 9 ft. 2 in. in height. It can be seen, then, that in shipping ATVs without crating, they can be placed two abreast in a semi-trailer and, given the length of the ATVs, only a limited number can be loaded onto the floor of the semi-trailer. The relative heights, however, are such that the hauling capacity can be doubled if means could be provided for stacking ATVs two high within the semi-trailer.

While it is recognized that a semi-trailer could be especially constructed with an intermediate deck between the floor and ceiling of the semi-trailer, this may impede the use of that trailer for shipping various commodities other than ATVs. It is, therefore, desirable to provide a decking system that can be readily installed and taken down by a single workman and which is relatively compact, allowing storage at the front of the truck trailer when not in use. Thus, a trucker would be able to haul twice the number of ATVs from a factory to a dealer/distributor and then could readily remove the deck structure when hauling other commodities on a return trip.

It is the principal purpose of the present invention to meet that need.

SUMMARY OF THE INVENTION

In accordance with the present invention, there is provided a modular deck system including a left-hand, a right-hand and a center track in each module where the tracks are supported on "E-bars" that span the width dimension of the trailer commonly found in semi-trailers. The opposed ends of the E-bars fit into selected opposed pairs of slots located in the vertical structure of the trailer wall, commonly referred to as "logistic posts". Each of the left-hand, right-hand and center track modules comprises a pair of parallel, spaced-apart rails, preferably fabricated from aluminum extrusions that are held together by transversely extending aluminum treads. Track modules are 8-ft. in length and supported by three E-bars (one at each end and one in the center). This dimension was carefully selected to accommodate safety, longevity, strength and flexibility. The track modules are designed so that they can be moved laterally on the "E" bars to accommodate various wheel stance dimensions and combination of vehicle models.

In further accordance with the invention, the left-hand and right-hand modular track segments are preferably about 12 in. in width while the center track segment is about 2 ft. in width. As such, when supporting two ATVs in side-to-side relation, the left wheel of the rightmost ATV and the right wheel of the leftmost ATV share the center section.

Once the several modules are installed so as to create an elevated deck from the front to the rear of the trailer, a ramp system is required to permit the ATVs to be driven from ground level either to the elevated deck or to the floor of the semi-trailer. In accordance with my invention, there is provided specially designed drive-up ramp assemblies that again are configured to be modular, allowing plural sections to be used for driving onto the elevated deck level from the ground position, and a single section when going from ground level to the trailer's floor or from the deck level to the trailer floor. By being able to ship ATVs from the manufacturer to dealers/distributors throughout the country in semi-trailers and without crating, significant savings to both the manufacturer and the dealer/distributor can be realized. First off, eliminating crates for the individual ATVs being shipped saves the manufacturer anywhere from $150 to $500 per vehicle, depending upon the models involved. The dealers do not have to bear the cost of disposal of the crating materials. Dealer personnel are not required to unload crated vehicles using forklifts or the like. Finally, warranty claims for freight damage are avoided in that the machines are available immediately for visual inspection rather than waiting until the vehicle is uncrated at the time of sale to a customer.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

FIG. 5 is a plan view of one section of the loading ramp illustrated in FIG. 4;

FIG. 6 is a side view of the ramp structure of FIG. 5; and

DESCRIPTION OF THE PREFERRED EMBODIMENT

Figure 1:
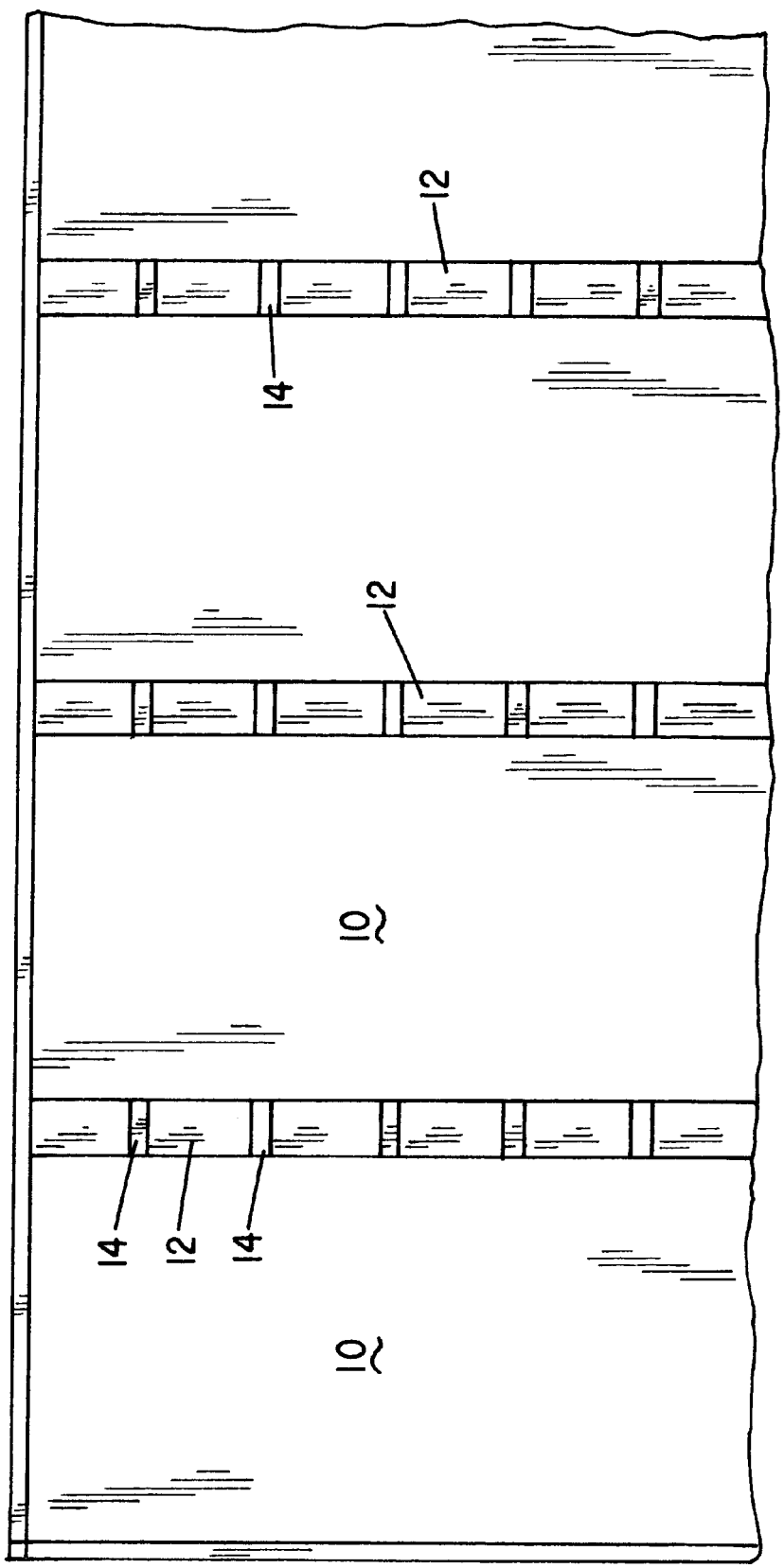
FIG. 1 is a partial side elevation of a wall of a semi-trailer in which the present invention is used.

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof. Said terminology will include the words above specifically mentioned, derivatives thereof and words of similar import.

Referring now to FIG. 1, there is shown a partial view of the interior side wall 10 of a conventional semi-trailer of known construction. The wall extends from the trailer's floor to ceiling and includes regularly spaced vertical steel channels or struts 12 (logistic posts) that include regularly spaced slots 14 along the length dimension thereof The logistic posts 12 on each of the trailer's side walls are aligned with one another across the width dimension of the trailer.

Figure 2:
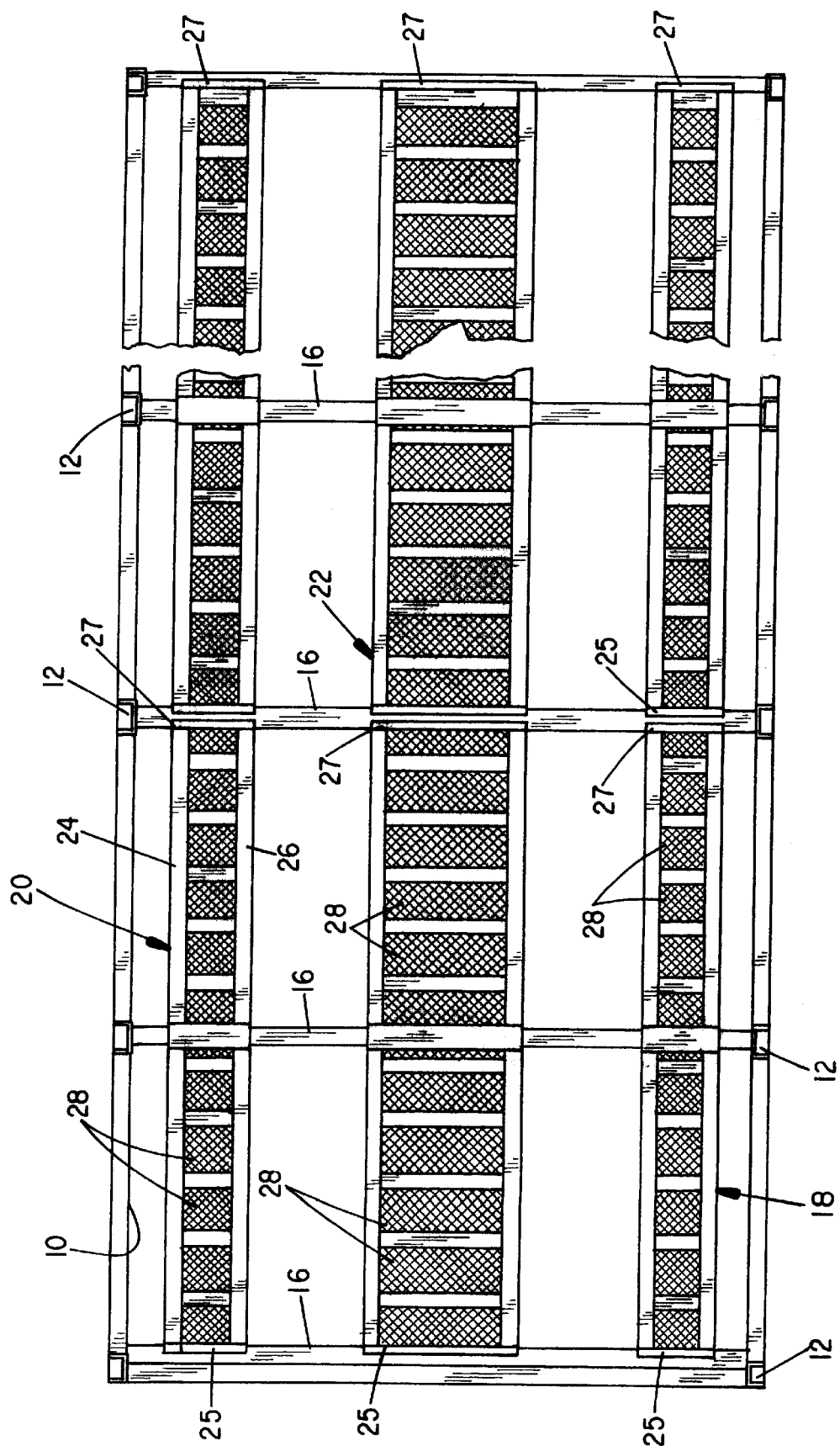
FIG. 2 is a top plan view illustrating the deck structure of the present invention installed in a semi-trailer.

Referring next to FIG. 2, there is shown a top view of one module of the elevated deck assembly. Identified by numeral 16 are the conventional E-bars whose opposed ends include a latch arrangement that is adapted to mate with a selected slot at the same height elevation along the vertical length of the opposed pair of logistic posts 12. Thus, the installed E-bars will be on 4-ft. centers and at the same height elevation approximately midway between the trailer's floor and ceiling.

With continued reference to FIG. 2, it can be seen that there is supported atop the installed E-bars a left-hand track member 18, a right-hand track member 20, and a center track member 22. The length of the individual track members is preferably about 8 ft. so that each track member will be supported by 3 E-bars, one in each end of the track segment and one at its approximate mid-point.

Each of the track sections comprises a pair of rails, as at 24 and 26, which may be extruded bars of I cross-section or, alternatively, can be extruded tubes of rectangular cross-section. Angle bars 25 and 27 (FIG. 2) are welded to the opposed ends of each of the track sections for engaging the E-bars. Extending between the pair of rails and welded thereto are aluminum decking members as at 28. Without limitation, each of the decking members may be approximately 9 in. in width with adjacent decking members 25 spaced apart by about 3 in. along the length of the rails. By spacing the decking members in the manner described, the overall weight of each individual track module is reduced without compromise of its structural integrity and load bearing ability for the load contemplated. The individual 8-ft. track segments are constructed such that the truck driver or other workmen can readily lift and position the track modules on the E-bars 16.

Figure 3:
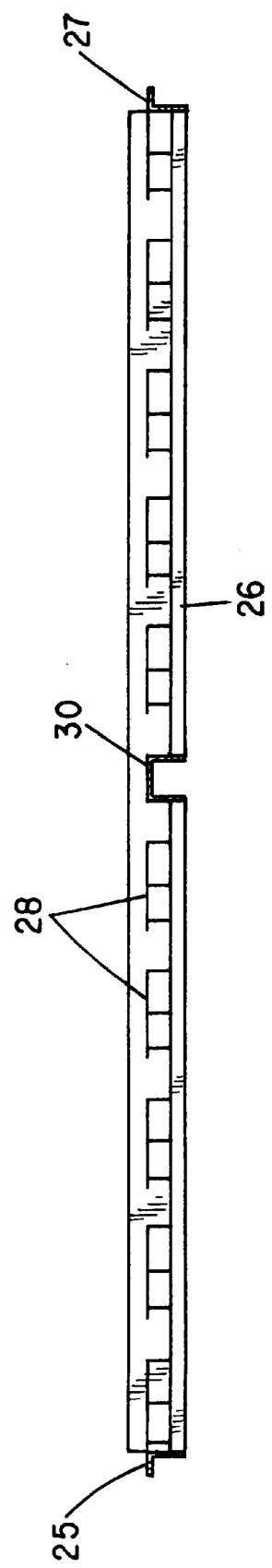
FIG. 3 is a side elevation of one of the track modules comprising the left and right modular track assemblies shown in FIG. 2.

It has also been found expedient to provide a transversely extending channel 30 (FIG. 3) defining a notch inset into the rails 24 and 26 of the track modules at their approximate midsections to allow them to engage the E-bar 16 at that location to prevent shifting of the track modules 18, 20 and 22 due to any sudden acceleration or deceleration of the vehicle.

Figure 4:
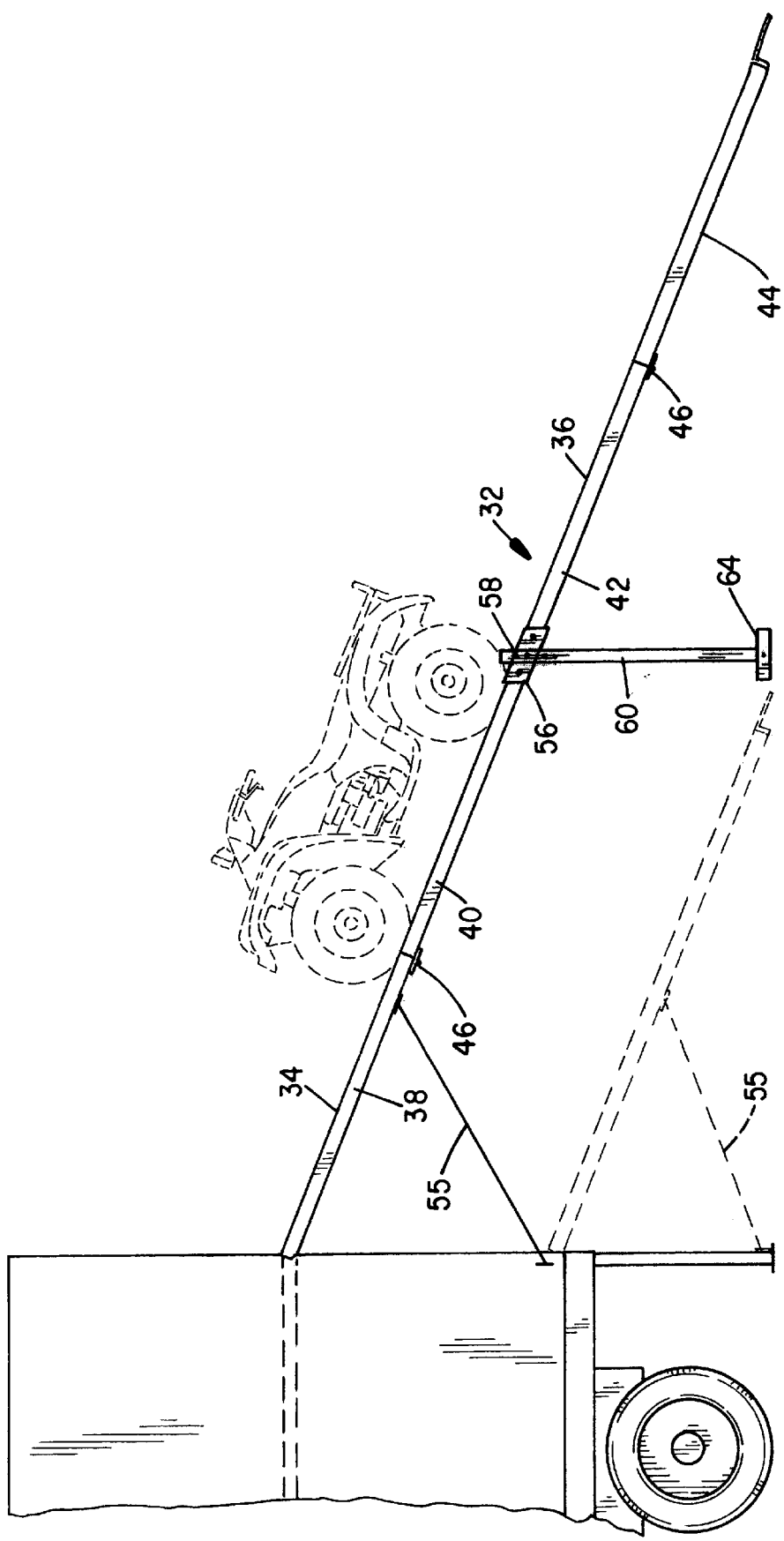
FIG. 4 illustrates a loading ramp structure used in driving ATVs into and from a semi-trailer.

Once the left, center and right track modules 18, 20 and 22, respectively, are installed so as to run the full length of the semi-trailer, the ATVs to be shipped may now be loaded. To facilitate the loading operation, the system of the present invention includes a ramp assembly that can be used to allow the ATVs to be driven from ground level, and up the ramp to either the floor level of the trailer or to the elevated deck comprising the installed track modules. Referring to FIG. 4, the loading ramp 32 is seen to comprise either one or two ramp sections 34 and 36, each approximately 10 ft. in length. Ramp sections 34 and 36 each comprised of two 5-ft. segments 38, 40 and 42, 44 that are hinged together at 46 to form a 10-ft. ramp section when unfolded. By providing the hinges 46 between the two 5-ft. sections, the ramp sections can be more readily folded for compact storage at the front of the trailer when not in use.

As shown in the plan view of FIG. 5, each of the ramp segments 38, 40, 42, and 44 comprises a pair of aluminum tubes 47 and 48 of rectangular cross-section that are maintained in parallel, spaced-apart relationship by a plurality of transversely extending deck panels 50 also formed from aluminum. The overall width of the ramp members may be about 1½ feet. A support angle member 52 (FIG. 6) is affixed to one end of the ramp and a skid plate 54 is affixed to the opposite end. The support angle plate 52 and the skid plate 54 are at appropriate angles to the horizontal so that when the support angle plate 52 rests on the floor of the trailer, the skid plate 54 will lie flat on the ground, adding stability to the ramp structures. Typically, if the angle plate 52 is affixed to the one end of the ramp so that the extension is at an angle of 23° to horizontal. The skid plate 54, which would be also at an angle of 23°, will rest flat on the ground when the ramp is used with a conventional semi-trailer. In addition, each ramp has a logistic slot attached to the back allowing for the ramp to be secured to the trailer by means of a logistic strap 55 to insure stability and safety.

It will be appreciated that two such ramps are necessary in order to drive an ATV onto the floor of the trailer (one for the ATV's left-hand wheels and one for its right-hand wheels).

Once two rows of ATVs have been loaded onto the trailer's floor, additional ATVs can be driven onto the elevated deck previously described. To do this, two 10-ft. ramp sections 34 and 36, like those shown in FIG. 5 are rigidly joined, end to end using splicing channels 56 (FIG. 4) that are bolted to the opposed side rails of the ramps so as to span the joint therebetween.

Figure 7:
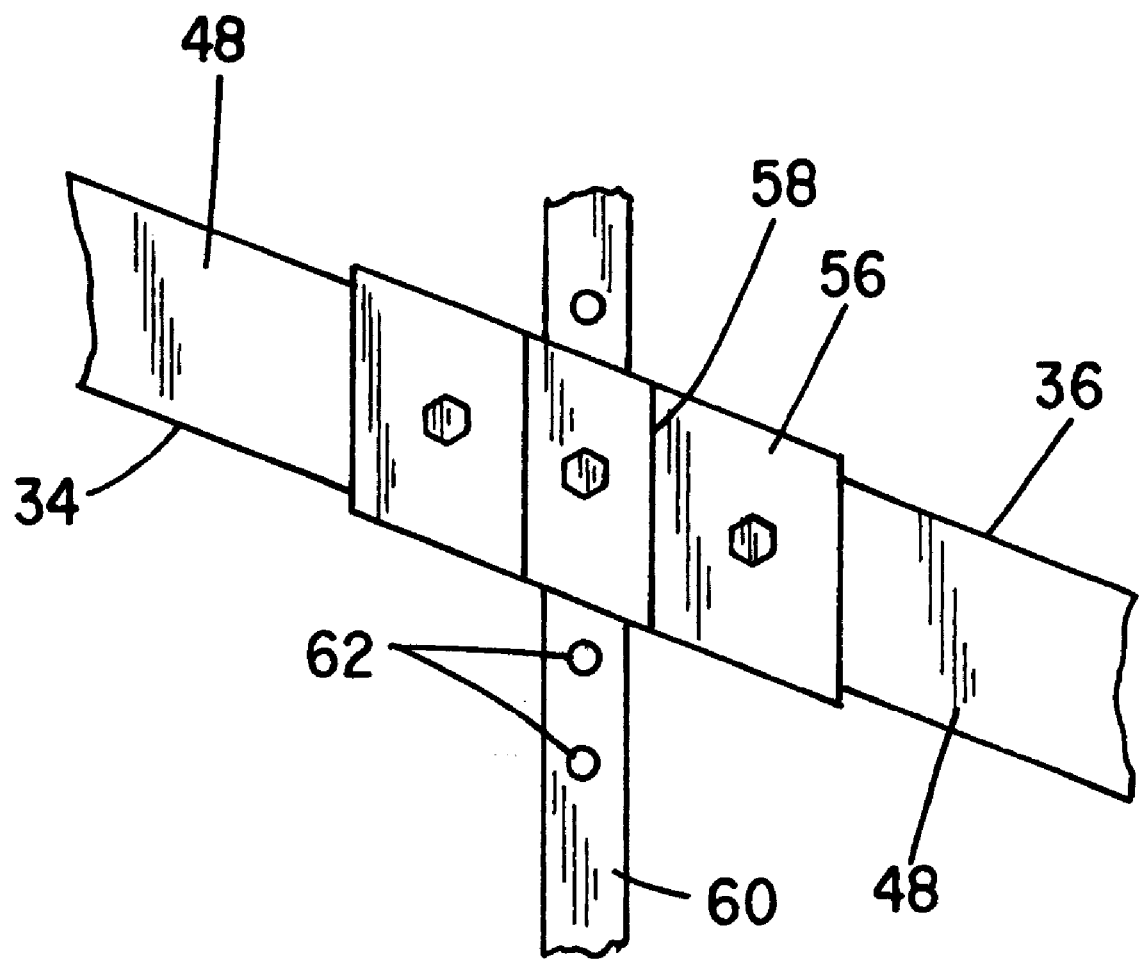
FIG. 7 is a partial view illustrating a splicing channel connecting to loading sections of the type shown in FIG. 4.

As can also be seen in FIG. 4 and the enlarged partial view of FIG. 7, there is welded to the splicing channels 56 a tubular socket member 58 for telescopingly receiving support legs 60 therein. These support legs 60 include a plurality of longitudinally spaced, transversely extending bores as at 62, allowing an appropriate length adjustment of the legs so that when a through bolt is inserted through the tubular socket and a selected bore in the leg, the foot 64 of the leg will rest on the ground.

The 20-ft. ramps that result when the two 10-ft. sections 34 and 36 are spliced together in the manner described provides for a more shallow angle of the ramps in extending from ground to the level of the elevated deck structure in the trailer. The support legs 60, of course, function to prevent bending or sagging of the ramp structures under the weight of the ATV being driven there over.

In use, two such 20-ft. ramps may first be generally aligned, one with the right-hand track modules comprising the right-hand track 20 and the other will be aligned with modules comprising the center section 22. Once one side of the trailer has been filled at the upper deck level, the ramps will be shifted laterally so as to be aligned with the left track 18 and with the center section 22. This allows a second string of ATVs to populate the remaining half of the upper deck.

Those skilled in the art will appreciate that unloading of ATVs from the semi-trailer can be accomplished in just the reverse order by driving the vehicles from the upper deck using the 20-ft. ramp arrangement and then driving the vehicles on the floor of the trailer down a shortened ramp.

Once the trailer is emptied, the 20-ft. ramp can be broken down into two foldable 10-ft. sections and when folded to have an overall 5-ft. length, they can be placed at the front portion of the trailer for storage. Likewise, the 8-ft. track modules comprising the upper deck can be removed from their position on the E-bars and stacked with the loading ramps proximate the front wall of the trailer for storage. Then, when the E-bars are taken down from the channels in the trailer's walls, they, too, can be conveniently stored in such a way as do not materially detract from the load capacity of the trailer. The trailer can now be used to haul other commodities.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. Apparatus for increasing the load capacity of semi-trailers when transporting motorized four-wheeled vehicles comprising:
    (a) left, center and right modular track assemblies, each comprising a plurality of track modules that are adapted to be supported on regularly spaced E-bars that extend transversely to a longitudinal axis of the trailer and are attached to vertical posts disposed in opposed sidewalls of the trailer approximately midway between a floor and a roof of the trailer, each of the track modules comprising the left, center and right modular track assemblies having a pair of rails of a predetermined length held in parallel, spaced-apart relation by transversely extending deck panels attached to said pair of rails, where a width dimension of the track modules of the center modular track assemblies is generally about two times a width dimension of the track modules comprising the right and left modular track assemblies, and the left, center and right modular track assemblies including a sufficient number of track modules to extend the full length of the trailer; and
    (b) a pair of ramps of a predetermined length, adapted to be longitudinally aligned selectively with either the right and center modular track assemblies or the left and center modular track assemblies, with one end of each of the pair of ramps resting on the ground and the other end of each of the ramps connected to a rearmost end of an endmost one of the track modules comprising the right and center modular track assemblies or the left and center modular track assemblies, said predetermined length of said pair of ramps providing a slope allowing the motorized four wheeled vehicles to be driven between the ground and a selected one of the right and center or left and center modular track assemblies.

2. The apparatus as in claim 1 wherein each track module of the left, center and right modular track assemblies is of a length sufficient to be supported by three E-bars.

3. The apparatus as in claim 1 wherein each of the pair of ramps comprise first and second elongated ramp segments joined end-to-end by a hinge.

4. The apparatus of claim 3 wherein each of the pair of ramps includes at least two sections of the hinged together ramp segments, said at least two sections being rigidly joined together end-to-end by removable splice channel members.

5. The apparatus of claim 4 wherein the splice channel members include a tubular socket for receiving a ground engaging leg member therein.

6. The apparatus of claim 4 wherein each ramp segment is about five feet in length.

7. The apparatus of claim 1 wherein the pair of rails of the track modules of the left, center and right modular track assemblies comprise aluminum extrusions and the deck panels comprise aluminum tubing whereby said track modules can be readily lifted onto and from the E-bars by a single person.

8. The apparatus of claim 1 wherein the width of the track modules comprising the left and right modular track assemblies have a width dimension of about one foot and the track modules comprising the center modular track assembly has a width dimension of about two feet.

9. The apparatus of claim 1 wherein the motorized four-wheeled vehicles are ATVs and the right and center modular track assemblies are positioned on the E-bars such that the wheels on the right side of the ATVs are adapted to sit on the right modular track assembly and the wheels on the left side of the ATVs are adapted to sit on the center modular track assembly.

10. The apparatus of claim 9 wherein the left modular track assembly is positioned on the E-bars such that the wheels on the left side of the ATVs are adapted to sit on the left modular track assembly and the wheels on the right side of the ATV are adapted to sit on the center modular track assembly.

* * * * *